(12) United States Patent
Weller

(10) Patent No.: US 8,505,998 B1
(45) Date of Patent: Aug. 13, 2013

(54) TRUCK BED LINER WITH INTEGRATED STORAGE SYSTEM

(75) Inventor: Kip D Weller, St. Charles, IL (US)

(73) Assignee: Kip D. Weller, St. Charles, IL (US)

( * ) Notice: Subject to any disclaimer, the term of this patent is extended or adjusted under 35 U.S.C. 154(b) by 0 days.

(21) Appl. No.: 13/563,881

(22) Filed: Aug. 1, 2012

(51) Int. Cl.
*B62D 33/00* (2006.01)
*B01D 45/00* (2006.01)

(52) U.S. Cl.
USPC .......................................... 296/39.2; 410/129

(58) Field of Classification Search
USPC .................................. 296/39.2, 37.6; 410/129
See application file for complete search history.

(56) References Cited

U.S. PATENT DOCUMENTS

| 5,044,682 | A |   | 9/1991 | Wayne |
|---|---|---|---|---|
| 5,265,993 | A | * | 11/1993 | Wayne ........................... 410/129 |
| 5,720,507 | A |   | 2/1998 | Emery |
| 5,788,310 | A |   | 8/1998 | Mckee |
| 6,015,178 | A |   | 1/2000 | Haack |
| 6,170,897 | B1 |   | 1/2001 | Karrer |
| 6,742,825 | B1 |   | 6/2004 | Macaulay |
| 6,986,541 | B1 |   | 1/2006 | Haack |
| 7,052,067 | B2 |   | 5/2006 | Walker |

* cited by examiner

*Primary Examiner* — Joseph Pape
(74) *Attorney, Agent, or Firm* — Evan D. Linderman

(57) ABSTRACT

A system is provided for storing items in the bed of a pickup truck. The system includes a bed liner, storage bin sides, storage bin tops, and storage bin dividers. The storage bin sides and storage bin tops are attached to the bed liner to create storage bins, and the bin dividers attach to both the storage bin sides and bed liner to divide the storage bins into smaller sections. Storage bin tops may include a center section cover to selectively cover the center section in between the storage bins in order to provide the full bed area above the storage bins for transporting construction material.

8 Claims, 7 Drawing Sheets

TRUCK BED LINER WITH INTEGRATED STORAGE SYSTEM

TECHNICAL FIELD

The present invention relates to systems and methods for storing items. More particularly, it relates to systems and methods for storing items in the bed of a pickup truck.

BACKGROUND OF THE INVENTION

Pickup trucks are useful vehicles for transporting large items or materials. Most pickup truck beds are designed to fit large, flat construction materials like drywall or plywood that are offered in 4'×8' sizes.

While the ability to fit large, flat items is beneficial, many truck owners need to transport smaller items that do not occupy most of the space in a truck bed. As a result, aftermarket pickup truck bed storage systems have been developed in order to provide the ability to store smaller items in the truck bed as well. These storage systems, however, tend to reduce the ability to utilize the entire bed area, so oftentimes there must be a tradeoff between having the ability to store smaller items and the ability to transport construction materials.

U.S. patent application Ser. No. 13/445,026 (Weller) discloses a storage system that is mounted directly to the bed of a pickup truck which provides storage boxes disposed on the sides of the bed and a center aisle in between the boxes. The center aisle can be selectively covered by a removable cover such that, when the cover is in place, the entire footprint of the bed may still be utilized for larger items, while smaller items may still be stored in the boxes or open section underneath. The entirety of U.S. patent application Ser. No. 13/445,026 is incorporated herein by reference.

Those storage systems that provide for both full bed access and smaller storage spaces tend to contain large components that may be both difficult to manufacture and costly to ship or transport. In addition, once those systems are installed, it may be difficult to remove if the entire bed depth is needed for any reason (such as needing to transport a large amount of construction materials that would require the full depth of the bed).

There exists a need in the market for an improved storage system for the bed of a vehicle that provides the ability to utilize the full bed area while storing smaller or oddly shaped items, and at the same time is smaller and less bulky than proposed solutions that are currently available, while providing for easy installation and removal, if necessary. The present invention provides an efficient storage system for the bed of a vehicle that addresses all of those issues.

BRIEF SUMMARY OF THE INVENTION

Benefits achieved in accordance with principles of the disclosed invention include a storage system for the bed of a pickup truck that can effectively and securely store small items, large or oddly shaped items, and construction items such as drywall or plywood all at the same time, wherein such flexibility and modularity is integrated into a single system that is modular and less costly to ship and manufacture than other systems currently available.

Some aspects of the present invention relate to bed liners, storage bin sides, storage bin tops, and bin dividers. The bed liner, storage bin sides and storage bin tops are assembled to create a system of storage bins within the bed of a vehicle. The bin dividers can be arranged within the storage bins to create smaller sections in which to store and transport smaller items.

Yet other aspects of the present invention relate to a center section cover integrated with the storage bin tops. When not in use, the center section cover is stowed either within the storage bins or on top of the storage bin tops. This configuration provides the ability to store small items in the storage bins, but still store large or oddly shaped items (such as skis, golf clubs, or a motorcycle) in the available space in between the storage bins. When in use, the center section cover is deployed such that it creates a flat surface with the storage bin tops which is raised above the bed of the pickup truck, and is essentially the same size as the bed of the pickup truck. This configuration provides the ability to simultaneously store small items in the storage bins, securely store large or oddly shaped items underneath the additional section and in between the storage bins, and store large construction items (like drywall or plywood) on the flat surface created by the removable cover and the storage bin tops.

DETAILED DESCRIPTION OF THE INVENTION

Figure 1A:
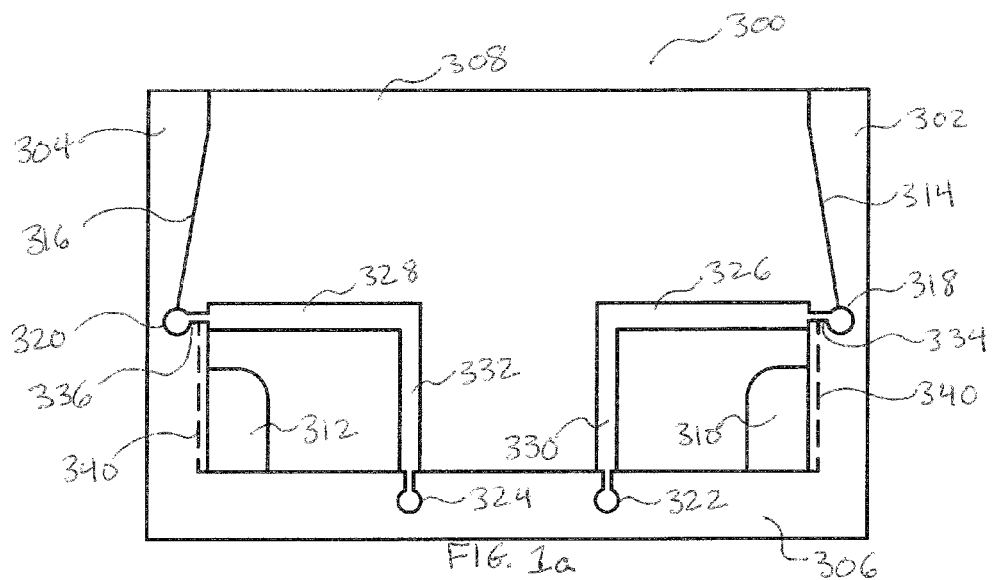
FIG. 1a is a rear view of a vehicle bed liner according to a preferred embodiment of the present invention.
Figure 1B:
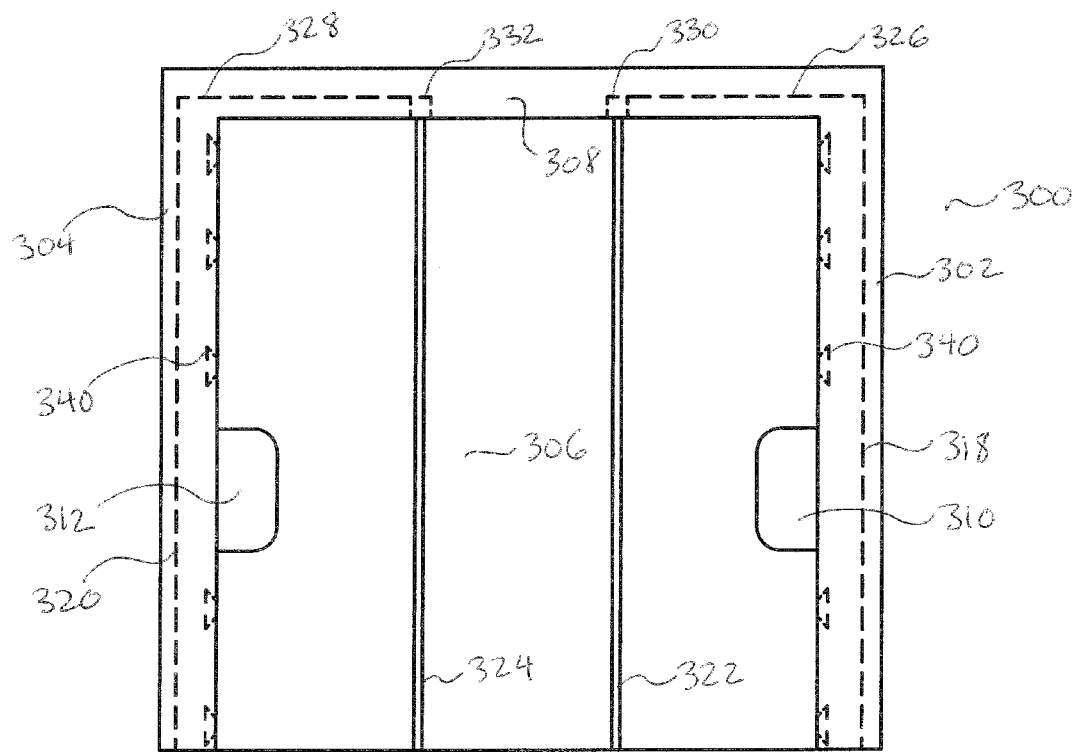
FIG. 1b is a top view of a vehicle bed liner according to a preferred embodiment of the present invention.

FIGS. 1a and 1b illustrate rear and top views, respectively, of a bed liner 300 in accordance with aspects of the present invention.

As shown in the figures, bed liner 300 includes side walls 302 and 304, bottom 306 and front wall 308. Bed liner 300 also includes wheel wells 310 and 312, angled surfaces 314 and 316, side notches 318 and 320, bottom notches 322 and 324, horizontal locking features 326 and 328, vertical locking features 330 and 332, sealing surfaces 334 and 336 and divider notches 340.

Bed liner 300 may be manufactured from a plastic material via a thermoforming manufacturing process, resulting in a one-piece liner. It may also be manufactured by molding or extruding multiple sections of material and then later joining them together to create a liner to cover the entire bed area. Regardless of the method of manufacture, bed liner 300 serves to cover and protect the bed of the truck from damage.

Wheel wells 310 and 312 are designed to fit over wheel wells in the bed of the truck. As trucks may have differing wheel well positions, wheel wells 310 and 312 may be shaped such that they fit a variety of different wheel well sizes, shapes and positions. In some cases, truck beds may not even contain wheel wells, in which case bed liner wheel wells 310 and 312 could be eliminated.

Side walls 302 and 304 include angled surfaces 314 and 316, respectively. Angled surfaces 314 and 316 are designed such that a storage bin top can be opened sufficiently wide to retrieve whatever item is of interest. Angled surfaces 314 and 316 will be described in further detail with reference to FIGS. 5a-b.

Side walls 302 and 304 also include side notches 318 and 320, respectively. Side notches 318 and 320 are designed to receive a mating portion of a storage bin top, such that the storage bin top is secured within side notches 318 and 320. Side notches 318 and 320 will be described in further detail with reference to FIGS. 5a-b.

Side walls 302 and 304 also include sealing surfaces 334 and 336 and divider notches 340. Sealing surfaces 334 and 336 are designed to create a seal when the storage bin top is in the closed position. Sealing surfaces 334 and 336 will be described in further detail with reference to FIGS. 5a-b. Divider notches 340 are sized and configured to accept bin dividers that can create smaller storage spaces for storing items. Divider notches 340 are provided along the length of side walls 302 and 304 at predetermined intervals, such that bin dividers can be fastened to side walls 302 and 304 in many different configurations to allow the user to create different sized sections for storing items of various sizes. As shown in the figure, divider notches 340 are shaped such that a mating divider cannot be easily removed or fall out of place under normal driving conditions. Those of ordinary skill in the art can appreciate that, while divider notches 340 are shown to have a triangular shape in FIG. 1b, they can be of any shape that would allow for mating dividers to be securely attached to side walls 302 and 304.

Divider notches 340 will be described in further detail with references to FIGS. 5a-b.

Bottom surface 306 includes bottom notches 322 and 324. Bottom notches 322 and 324 are designed to receive a mating portion of a storage bin side, such that the storage bin side is secured within bottom notches 322 and 324. Bottom notches 322 and 324 will be described in further detail with reference to FIGS. 5a-b.

Front wall 308 includes horizontal locking features 326 and 328. Horizontal locking features 326 and 328 are depressions in front wall 308 that are designed to mate with a storage bin top in order to lock the top in place to prevent theft. Horizontal locking features 326 and 328 will be described in further detail with reference to FIGS. 5c-d.

Front wall 308 also includes vertical locking features 330 and 332. Vertical locking features 330 and 332 are depressions in front wall 308 that are designed to mate with a storage bin side in order to lock the storage bin side in place and prevent it from moving, providing a more robust storage system. Vertical locking features 330 and 332 will be described in further detail with reference to FIG. 5a.

Figure 1C:
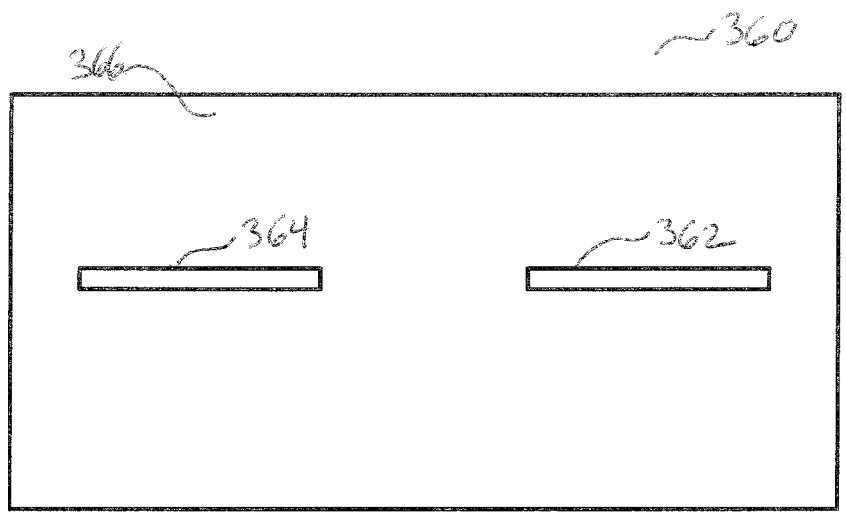
FIG. 1c is a rear view of a vehicle tailgate liner according to a preferred embodiment of the present invention.
Figure 1D:
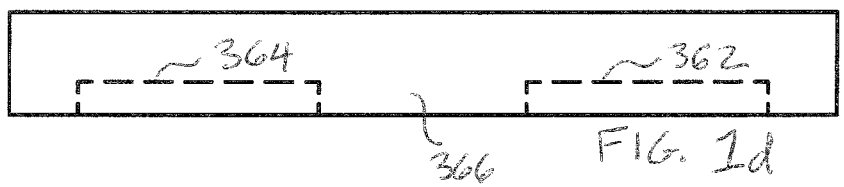
FIG. 1d is a top view of a vehicle tailgate liner according to a preferred embodiment of the present invention.

FIGS. 1c and 1d illustrate front and top views, respectively, of tailgate liner 360.

As shown in the figure, tailgate liner 360 includes tailgate liner surface 366 and tailgate locking features 362 and 364.

Tailgate liner 360 may be manufactured from a plastic material via a thermoforming manufacturing process, resulting in a one-piece liner. It may also be manufactured by molding or extruding multiple sections of material and then later joining them together to create a liner to cover the entire tailgate area. Regardless of the method of manufacture, tailgate liner 360 serves to cover and protect the tailgate of the truck from damage.

Tailgate liner 360 may be attached to the tailgate by any conventional means currently available for attachment. Non-limiting examples of attachment means include mechanical fasteners, adhesive fasteners and press fit means.

Tailgate locking features 362 and 364 are depressions in tailgate liner 360 that are designed to mate with a storage bin top in order to lock the top in place to prevent theft. Tailgate locking features 362 and 364 will be described in further detail with reference to FIGS. 5c-d.

Figure 2A:
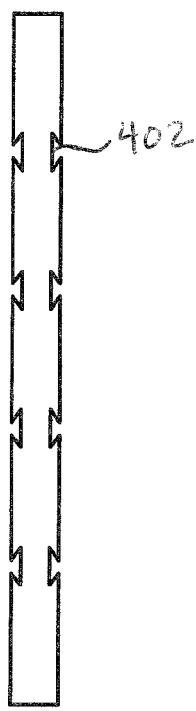
FIG. 2a is a top view of a storage bin side according to a preferred embodiment of the present invention.
Figure 2B:
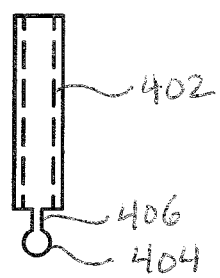
FIG. 2b is a front view of a storage bin side according to a preferred embodiment of the present invention.

FIGS. 2a-b illustrate top and front views, respectively, of storage bin side 400. Storage bin side 400 includes notches 402, post 406 and bulb 404.

Storage bin side 400 is preferably constructed from rigid plastic, either via a molding or extrusion process, or any other process that may be suitable for manufacturing a large, plastic component. It may also be constructed from other materials suitable for the outdoor environment, including metal or composite materials. Regardless of the material chosen for construction, storage bin side 400 is preferably constructed from a lightweight material to provide for easier installation and shipping.

Notches 402 provide spaces in which storage bin dividers can be securely fastened to storage bin side 400. Notches 402 are provided along the length of storage bin side 400 at predetermined intervals, such that bin dividers can be fastened to storage bin side 400 in many different configurations to allow the user to create different sized sections for storing items of various sizes. As shown in the figure, notches 402 are shaped such that a mating divider cannot be easily removed or fall out of place under normal driving conditions. Those of ordinary skill in the art can appreciate that, while notches 402 are shown to have a triangular shape in FIG. 2a, they can be of any shape that would allow for mating dividers to be securely attached to storage bin side 400.

Post 406 and bulb 404 serve to secure storage bin side 400 to bottom surface 306 of bed liner 300 shown in FIGS. 1a-b. Referring back to FIGS. 1a-b, bottom notches 322 and 324 are designed to slidably receive post 406 and bulb 404 such that storage bin side 400 can be attached to bed liner 300 by sliding post 406 and bulb 404 within bottom notches 322 and 324. The shape of bottom notches 322 and 324, post 406, and bulb 404 serve to provide support to storage bin side 400 to maintain it in an upright position and prevent it from falling over.

While the mechanism to secure storage bin side 400 to bed liner 300 was described above as a system of mating notches, posts and bulbs, other methods to secure storage bin side 400 to bed liner 300 can be employed. For instance, the mechanism could employ a simple set of depressions within bed liner 300 into which storage bin side 400 could be placed. Another method could simply utilize the geometry of notches 402 and provide mating notches within bed liner 300 such that storage bin side 400 could be slid into mating notches within bed liner 300. Yet another method could utilize mechanical fasteners, where storage bin side 400 could be attached to bed liner 300 via mechanical fasteners (i.e., screws, bolts, L-brackets, etc.) such that bottom notches 322 and 324 would not be required. The attachment mechanisms listed above are intended to be general, nonlimiting examples and not inclusive of all potential means to attach storage bin side 400 to bed liner 300 that would be obvious to those of ordinary skill in the art.

Figure 3A:
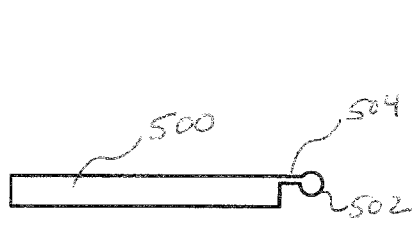
FIG. 3a is a front view of a storage bin top according to a preferred embodiment of the present invention.

FIG. 3a illustrates a front view of storage bin top 500 in accordance with aspects of the present invention. As shown in the figure, storage bin top 500 includes post 504 and bulb 502.

Storage bin top 500 is preferably constructed from rigid plastic, either via a molding or extrusion process, or any other process that may be suitable for manufacturing a large, plastic component. It may also be constructed from other materials suitable for the outdoor environment, including metal or composite materials. Regardless of the material chosen for construction, storage bin top 500 is preferably constructed from a lightweight material to provide for easier installation and shipping.

Post 504 and bulb 502 serve to secure storage bin top 500 to side surfaces 302 and 304 of bed liner 300 shown in FIGS. 1a-b. Referring back to FIGS. 1a-b, side notches 318 and 320 are designed to slidably receive post 504 and bulb 502 such that storage bin top 500 can be attached to bed liner 300 by sliding post 504 and bulb 502 within side notches 318 and 320. The shape of bottom notches 318 and 320, post 504, and bulb 502 secure storage bin top 500 to bed liner 300 and allow storage bin top 500 to be rotated with respect to bed liner 300 in order to be opened and closed to reach items that have been stored.

While the mechanism to secure storage bin top 500 to bed liner 300 was described above as a system of mating notches, posts and bulbs, other methods to secure storage bin top 500 to bed liner 300 can be employed, so long as those mechanisms allow for storage bin top 500 to be secured to bed liner 300 while still providing for storage bin top 500 to be rotated in order to open the top of the storage bin in order to reach items that have been stored.

Figure 3B:
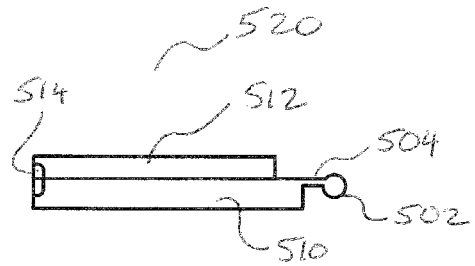
FIG. 3b is a front view of a storage bin top according to another preferred embodiment of the present invention.

FIG. 3b is a front view of storage bin top 520 in accordance with another preferred embodiment of the present invention.

As shown in the figure, storage bin top 520 includes side section cover 510, center section cover 512, connector 514, post 504 and bulb 502.

Side section cover 510, center section cover 512, post 504 and bulb 502 are preferably constructed from rigid plastic, either via a molding or extrusion process, or any other process that may be suitable for manufacturing a large, plastic component. They may also be constructed from other materials suitable for the outdoor environment, including metal or composite materials. Regardless of the material chosen for construction, Side section cover 510, center section cover 512, post 504 and bulb 502 are preferably constructed from a lightweight material to provide for easier installation and shipping.

Connector 514 is operable to rotatably connect side section cover 510 with center section cover 512. Connector 514 may be a traditional hinge to connect side section cover 510 with center section cover 512 as two distinct pieces, but connector 514 may also be a living hinge that is integral to side section cover 510 and center section cover 512 as a single, integrated component. Connector 514 may also be any other type of connector that would allow for rotation between side section cover 510 and center section cover 512. Additionally, more than one connector 514 may be employed along the length of storage bin top 520 to provide additional support as needed between side section cover 510 and center section cover 512.

Side section cover 510 is operable to create the top of a storage bin by spanning the space between side surfaces 302 or 304 of FIGS. 1a-b and storage bin sides 400 of FIGS. 2a-b.

Center section cover 512 is operable to create the top over the center section within the storage system by spanning the space between storage bin sides 400 of FIGS. 2a-b.

Post 504 and bulb 502 serve the same purpose in conjunction with storage bin top 520 as previously described for use with storage bin top 500 with reference to FIG. 3a. Storage bin top 520 will be further described with reference to FIG. 5e.

Figure 4A:
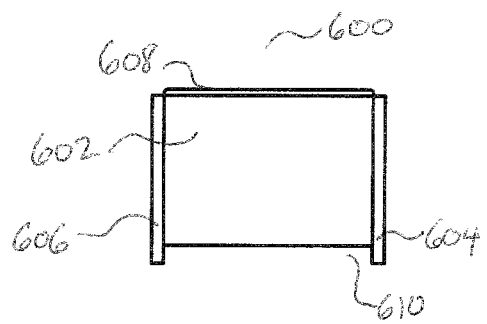
FIG. 4a is a front view of a bin divider according to a preferred embodiment of the present invention.
Figure 4B:
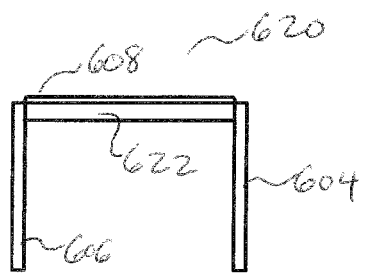
FIG. 4b is a front view of a bin divider according to another preferred embodiment of the present invention.
Figure 4C:
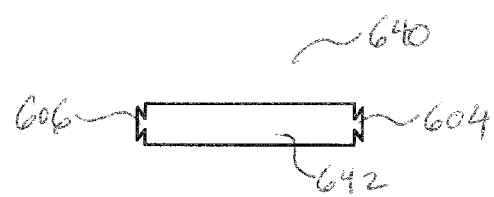
FIG. 4c is a top view of a bin divider according to a preferred embodiment of the present invention.

FIGS. 4a-4c illustrate bin dividers in accordance with aspects of the present invention.

FIG. 4a illustrates a front view of full bin divider 600. Full bin divider 600 includes divider surface 602, notches 604 and 606, gasket 608, and space 610.

Divider surface 602 is preferably constructed from rigid plastic, either via a molding or extrusion process, or any other process that may be suitable for manufacturing a large, plastic component. It may also be constructed from other materials suitable for the outdoor environment, including metal or composite materials. Regardless of the material chosen for construction, divider surface 602 is preferably constructed from a lightweight material to provide for easier installation and shipping.

Notches 604 and 606 are preferably integrally formed with divider surface 602, such that there are no joint surfaces between notches 604 and 606 and divider surface 602. In instances where notches 604 and 606 and divider surface 602 are not integrally formed, notches 604 and 606 are preferably constructed from the same materials as divider surface 602.

As shown in FIG. 4a, notches 604 and 606 extend slightly beyond divider surface 602, leaving space 610. Space 610 is provided to allow for drainage when desired. When full bin divider 600 is in place oriented such that space 610 is adjacent to bed liner 300 (not shown), notches 604 and 606 will contact bed liner 300 before divider surface 602 contacts bed liner 300, creating space 610. If liquid spills within the storage bins it can flow out of the bins via space 610 so as to urge the liquid out of the storage bins and not damage other items in the storage space.

Opposite of space 610 is gasket 608. Gasket 608 is attached to divider surface 602 via adhesive, and it can be manufactured from rubber, plastic, or any other material suitable for purposes of gasketing. When full bin divider 600 is in place and oriented such that gasket 608 is in full contact with bed liner 300, a seal is created between full bin divider 600 and bed liner 300. If liquid spills within the storage bins it will be contained by gasket 608 and prevent liquid from exiting the bin in which it spilled.

Gasket 608 may also be used to seal against any storage bin tops that are placed on top of bin divider 600 to prevent water from entering storage bins from outside.

Full bin divider 600 is therefore a dual-purpose divider in that, depending on the orientation in which it is installed, it may allow liquid to flow in or out, or it may be fully sealed and not allow the ingress or egress of liquid.

FIG. 4b illustrates a front view of partial bin divider 620. Partial bin divider 620 includes notches 604 and 606, partial divider surface 622 and gasket 608.

Partial divider surface 622 is preferably constructed from rigid plastic, either via a molding or extrusion process, or any other process that may be suitable for manufacturing a large, plastic component. It may also be constructed from other materials suitable for the outdoor environment, including metal or composite materials. Regardless of the material chosen for construction, partial divider surface 622 is preferably constructed from a lightweight material to provide for easier installation and shipping.

Notches 604 and 606 are preferably integrally formed with partial divider surface 622, such that there are no joint surfaces between notches 604 and 606 and divider surface 622. In instances where notches 604 and 606 and divider surface 622 are not integrally formed, notches 604 and 606 are preferably constructed from the same materials as divider surface 602.

Partial bin divider 620 is designed to provide support between bed liner 300 (not shown) and storage bin side 400 (not shown) such that the top of storage bin side 400 does not sway back and forth during transportation. Partial bin divider 620 can also allow for the user to reach in and remove items from a storage bin without opening storage bin top 500 (not shown). Partial bin divider 620 may be installed at the very rear of the bed such that when the tailgate is opened, the storage bin at the very rear of the truck bed would be open and free to add or remove items without having to climb into the truck bed and open the storage bin top 500 to add or remove items.

Gasket 608 may be used to seal against any storage bin tops that are placed on top of bin divider 600 to prevent water from entering storage bins from outside.

FIG. 4c illustrates a top view of bin divider 640. Bin divider 640 may be either a full bin divider 600 or a partial bin divider 620, and it includes divider surface 642 and notches 604 and 606.

Divider surface 642 may be either a full divider surface 602 or a partial divider surface 622, and is preferably constructed from rigid plastic, either via a molding or extrusion process, or any other process that may be suitable for manufacturing a large, plastic component. It may also be constructed from other materials suitable for the outdoor environment, including metal or composite materials. Regardless of the material chosen for construction, divider surface 642 is preferably constructed from a lightweight material to provide for easier installation and shipping.

Notches 604 and 606 are shaped to mate with notches 402 on storage bin side 400 (not shown) and with divider notches 340 on bed liner 300 (not shown). As notches 604 and 606 are slid into notches 402 and 340, bin divider 640 serves to divide the overall storage space into smaller, more manageable spaces, and it serves to make the entire structure more rigid by providing support along the length of storage bin side 400.

Figure 5A:
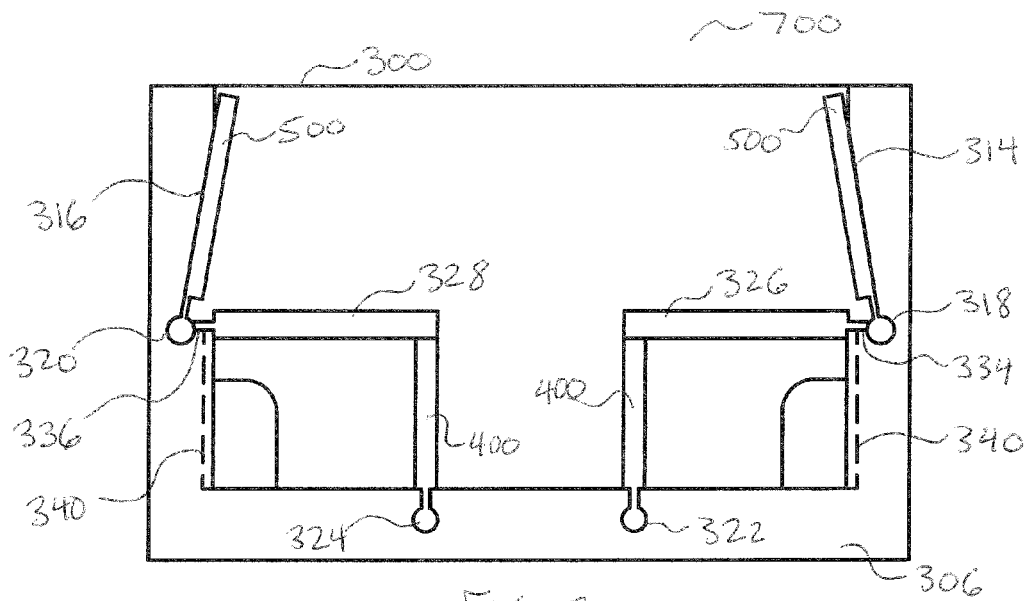
FIG. 5a is a rear view of the bed liner storage system with open storage bins according to a preferred embodiment of the present invention.
Figure 5B:
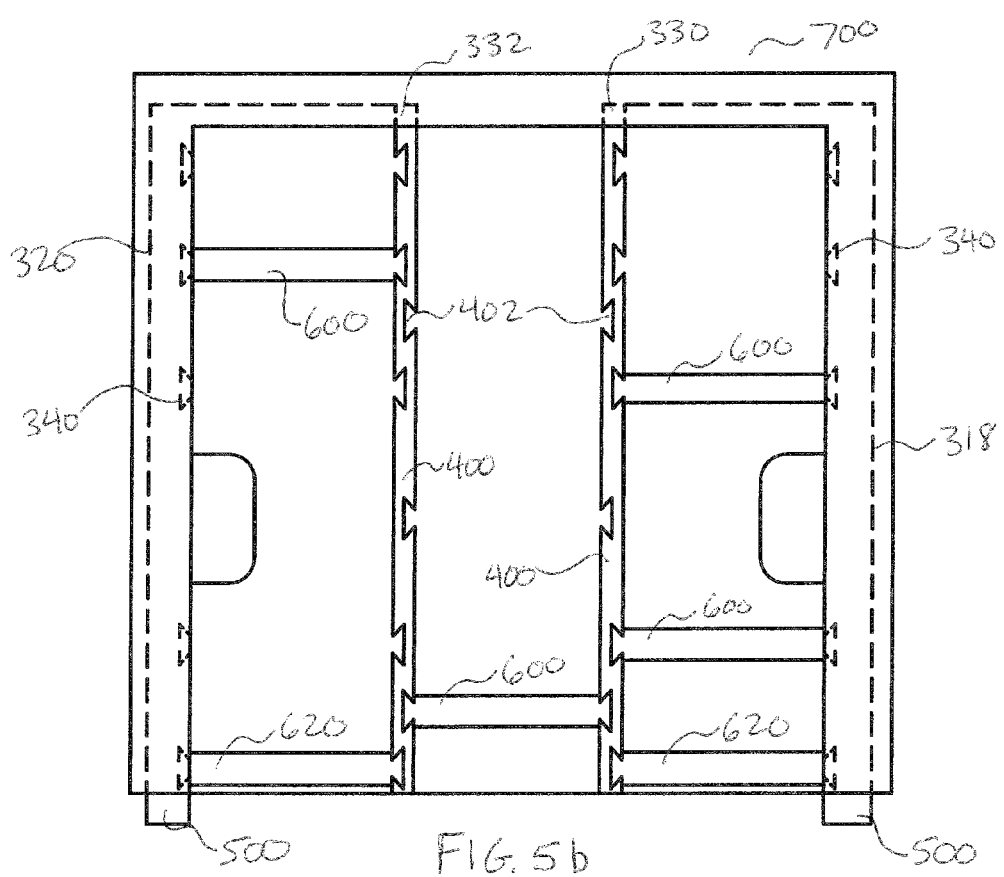
FIG. 5b is a top view of the bed liner storage system with open storage bins according to a preferred embodiment of the present invention.

FIGS. 5a-5b illustrate a front view and top view, respectively, of bed liner storage system 700 in the process of being constructed by a user.

In order to create bed liner storage system 700, the user must first attach bed liner 300 to the bed of the vehicle. This can be accomplished with any standard attachment means, such as mechanical fasteners (screws, bolts, rivets, etc.), adhesive fasteners, or any other fastening means by which a bed liner can be secured to the bed of a vehicle. Some bed liners may also attach to the bed of the vehicle without any fasteners, where they liner is kept in place via compression imparted to it by the sides of the vehicle in which it is installed.

After bed liner 300 is secured to the vehicle bed, storage bin sides 400 may be secured to bed liner 300 by sliding bin sides 400 into bottom notches 322 and 324 until storage bin sides 400 are secured within vertical locking features 330 and 332. Vertical locking features 330 and 332 prevent storage bin sides 400 from bowing or swaying at the front end of bed liner 300.

To add more rigidity and security to bed liner storage system 700, full bin dividers 600 and partial bin dividers 620 may be inserted in various positions by sliding them into notches 340 and 402, as shown in FIG. 7b. Adding dividers at the rear end of bed liner 300 will aid in increasing rigidity of bed liner storage system 700, such that bin sides 400 will not sway or bend during transportation.

The method to provide security and rigidity to bed liner storage system 700 discussed above is a non-limiting example of a way to prevent bin sides 400 from swaying or bending during transportation. Other means could be employed to prevent bin sides 400 from swaying or bending during transportation. For example, an elastic cord, like a bungee cord, may be used to connect bin side 400 to bed liner 300. As another example, a shaped metal retainer may be provided that can connect to bed liner 300 and fit over the top of bin side 400. As yet another example, a threaded rod may be passed through a hole in bin side 400 and then attached to bed liner 300. A connector could then be attached to the other end of the threaded rod to create a secure connection.

Referring back to FIGS. 2a-b and FIG. 3a, storage bin side 400 and storage bin top 500 may be constructed with exactly the same geometry to provide for more streamlined manufacturing, as long as the connection mechanism to attach bin side 400 and bin top 500 to bed liner 300 would provide for stability of bin side 400 and provide the ability to open and shut bin top 500. It can be noted that if bin side 400 is manufactured without notches 402, bed liner 300 would not need to be manufactured with divider notches 340, and stability of the system would need to be maintained in a different way. A simple solution would be to provide bin dividers without notches that were sized to fit snugly in between bed liner 300 and bin sides 400, and also in between both bin sides 400, such that bin sides 400 would be captured in between the bin dividers and would not be able to move or sway during transportation.

Returning to FIGS. 5a-b, after the desired bin dividers are installed, storage bin tops 500 may be secured to bed liner 300 by sliding storage bin tops 500 into side notches 318 and 320 until storage bin tops 500 contact the front wall of bed liner 300. The mating shapes of side notches 318 and 320 and storage bin tops 500 allow the user to rotate bin tops 500 in order to open and close the storage bins. In the open position, as shown in FIG. 5a, bin tops 500 contact angled surfaces 314 and 316. In order to keep bin tops 500 in an open position when loading or unloading the storage bins, angled surfaces 314 and 316 may contain a feature, i.e., a magnet or a detent or a strap, where bin tops 500 would contain the mating feature, i.e., a magnet or boss or clip, such that the user would not need to hold bin tops 500 open. It can be appreciated that angled surfaces 314 and 316 can be manufactured at any angle that would allow bin tops 500 to open easily. As non-limiting examples, angled surfaces 314 and 316 may allow bin tops 500, while in the open position, to create an angle of less than 90 degrees, greater than 90 degrees, or equal to 90 degrees between bin tops 500 and bottom surface 306 of bed liner 300.

While the above system was described as one that was designed to fit within a bed liner 300 that was designed specifically for use with the system, it can be appreciated that any standard bed liner may be modified to become compatible with the system components described above. After market kits could be developed to provide users the appropriate connection means (either via mechanical fasteners, adhesives, or other types of connections) to connect the adapter kits to other bed liners.

Figure 5C:
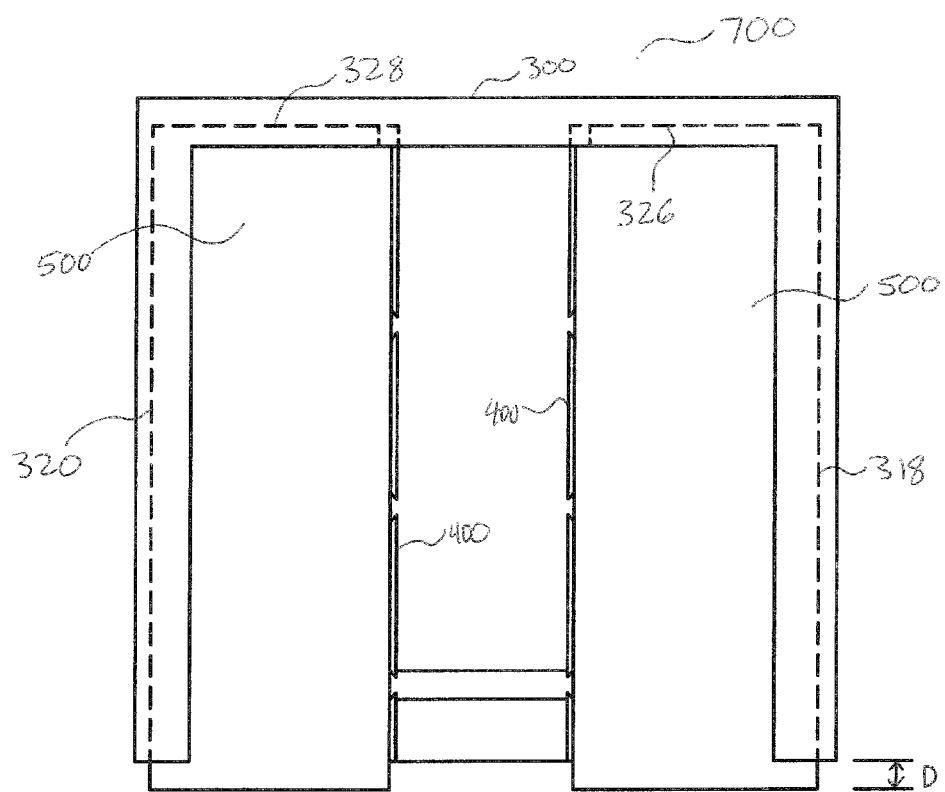
FIG. 5c is a top view of the bed liner storage system with closed storage bins according to a preferred embodiment of the present invention.

With reference now to FIG. 5c, which illustrates a top view of bed liner storage system 700, the configuration shown is after bin tops 500 have been inserted within side notches 318 and 320 and bin tops 500 are in a closed position, resting on bin sides 400.

To assure that bed liner storage system 700 prevents water from entering the storage bins, the mating surface between bin tops 500, bin sides 400 and bin dividers 600 and 620 must be sealed. This may be accomplished by providing a gasket material around the perimeter of bin tops 500, the top surface of bin sides 400, or both, along with positioning bin dividers 600 and 620 (not shown) such that gasket 608 (not shown) is in contact with bin tops 500. In addition to creating a seal with bin sides 400 and bin dividers 600 and 620, bin tops also must create a seal at the interface between bed liner 300 and bin tops 500. This could be accomplished by providing additional gasket material along sealing surfaces 334 and 336 (not shown), such that when bin tops 500 are closed they contact the gasket material along sealing surfaces 334 and 336 to further prevent liquid from entering the storage space.

An alternative method of assuring the storage bins remain sealed requires using additional bin liners that can drop in to the storage areas created when bin dividers 600 and 620 are secured in place. The additional bin liners would include gasket material around the perimeter of the top surface of the bin liners such that when bin tops 500 are closed, they would be in contact with the gasket material of the bin liners and would prevent liquid from entering the storage bins.

As shown in the figure, bin tops 500 extend beyond the rearmost portion of bed liner 300 by a distance D. For the user to lock bin tops 500 in place, the user would push bin tops 500 toward the front of bed liner 300, which would cause bin tops 500 to engage with horizontal locking features 326 and 328. While bin tops 500 are engaged with horizontal locking features 326 and 328 it is not possible to open bin tops 500, as horizontal locking features 326 and 328 are sized to prevent bin tops 500 from being opened.

In order to open bin tops 500, the user would have to pull bin tops 500 toward the rear of bed liner 300 until bin tops 500 were no longer engaged with horizontal locking features 326 and 328. When they are no longer engaged, the user may open bin tops 500 by rotating them relative to side notches 318 and 320.

Figure 5D:
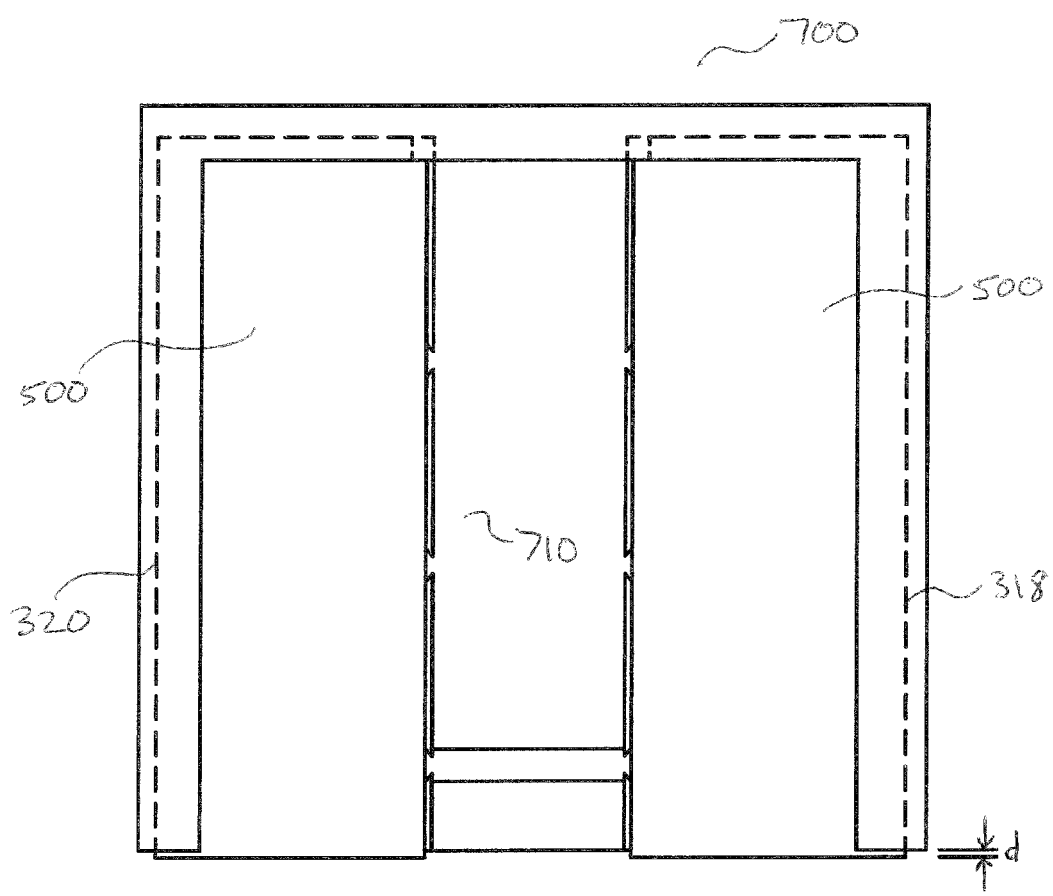
FIG. 5d is a top view of the bed liner storage system with closed storage bins according to a preferred embodiment of the present invention.

In the locked configuration, as shown in FIG. 5d, bin tops 500 would now extend beyond the rearmost portion of bed liner 300 by a distance d, where d is smaller than D. Bin tops 500 extend beyond the rearmost portion of bed liner 300 even in this configuration to provide an additional locking feature when the tailgate is closed.

Returning to FIG. 1c, when the tailgate is closed, tailgate liner 360 engages with bin tops 500 at tailgate locking features 362 and 364. This engagement provides more security to prevent bin tops 500 from being opened.

It can be appreciated that it may not be required to have both locking features (the tailgate locking feature and the locking feature within the front wall of the bed liner), but just one of the locking features may be sufficient. In addition, the features discussed above serve to provide non-limiting examples of locking features, and other locking features may be used. Another locking feature that may be utilized includes posts that are part of the tailgate liner. The height of the posts would be slightly higher than the height of bin tops 500. When the tailgate is closed the posts would be located just above the top surface of bin tops 500, such that if an attempt is made to open bin tops 500 the posts would prevent them from being opened.

In the fully assembled configuration, bed liner storage system 700 creates storage bin spaces on the sides of the bed, while providing center section 710 to store large or oddly shaped items. It may be desirable to cover center section 710 to provide additional storage underneath the covered center section, but also to provide for a flat storage area above the storage bins upon which large construction materials may be stored.

Figure 5E:
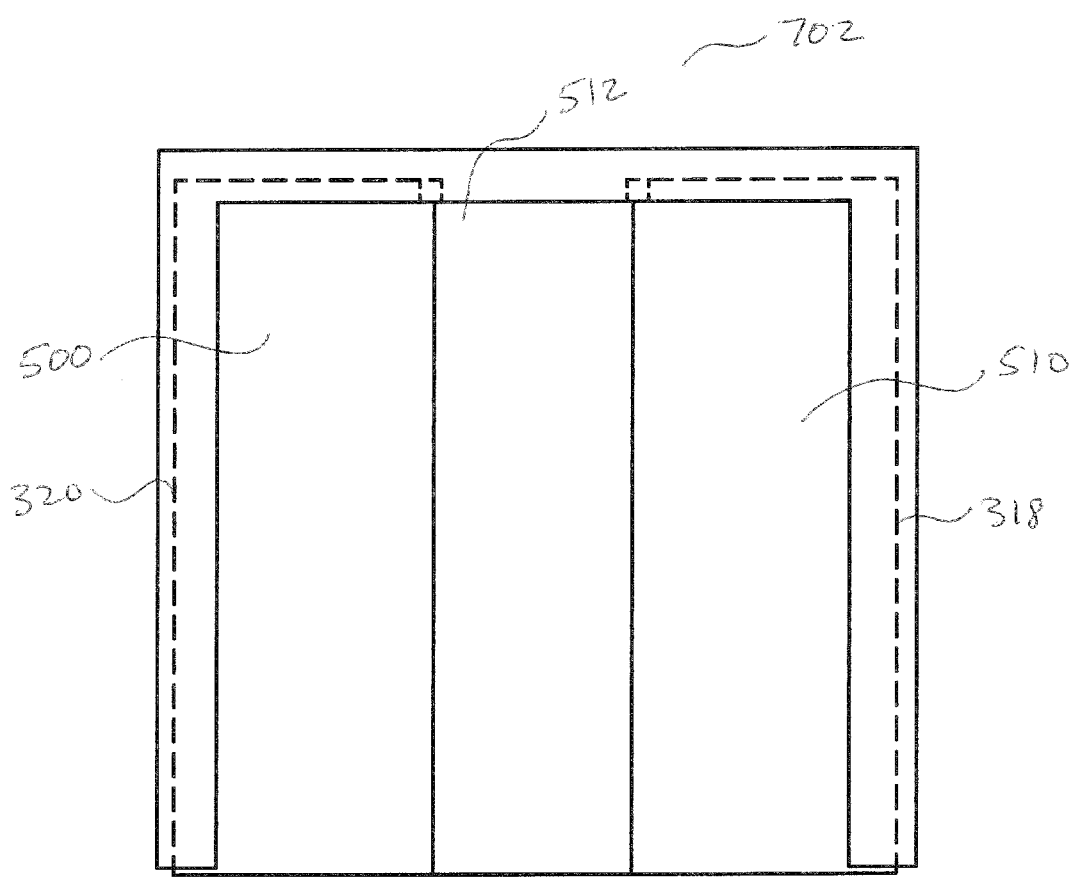
FIG. 5e is a top view of the bed liner storage system with closed storage bins according to another preferred embodiment of the present invention.

FIG. 5e is a top view of bed liner storage system 702 with closed storage bins according to another preferred embodiment of the present invention.

Bed liner storage system 702 is similar to bed liner storage system 700 of FIGS. 5a-d, however bed liner storage system 702 includes one of storage bin top 500 and one of storage bin top 520, which includes side section cover 510 and center section cover 512.

Storage bin top 500 is utilized in bed liner storage system 702 in a substantially similar manner to how it is utilized in bed liner storage system 700.

In operation, storage bin top 520 is installed in bed liner storage system 702 in the same manner in which storage bin top 500 is installed in bed liner storage system 700 from FIGS. 5a-d. When storage bin top 520 is installed, though, center section cover 512 is folded over such that it is on top of side section cover 514, leaving center section 710 (not shown) open when storage bin top 520 is transitioned to the closed position.

If the user desires center section 710 be covered, though, center section cover 512 may be rotated with respect to side section cover 514, such that center section cover 512 contacts both bin sides 400 (not shown) to create a flat surface that covers substantially the entire area of the bed, while leaving the storage bins beneath the covers available for storing smaller items. The entire area of the bed may be used to transport larger items such as construction materials.

When storage bin top 520 is utilized with bed liner system 700, it may be desirable to incorporate locking features that would be captured by tailgate liner 360 of FIGS. 1c-d, though it would be obvious to one of ordinary skill in the art that the geometry of the locking features may need to change to accommodate the longer cover section.

In addition, it may be desirable to incorporate a locking feature for storage bin top 520 similar to the capture mechanism employed in FIGS. 5c-d, though it would be obvious to one of ordinary skill in the art that the geometry of the locking features may need to change to accommodate the longer cover section, Also, it can be appreciated that side walls 302 or 304 may need to be slightly modified to accept the different shape of storage bin top 520.

Other methods of creating an additional section of material that may be used to cover the center aisle may be found in U.S. application Ser. No. 13/445,026. It can be appreciated that, with any additional section attached to bin tops 500, larger or longer locking features in bed liner 300 or tailgate liner 360 may be required in order to fully secure the system.

With substantially the entire bed area available for the transport of larger construction items, it may be beneficial to incorporate some features to capture the larger construction items on top of bed liner storage system 702 to assure that the items remain in place during transportation. Various methods to secure the items in place can be found in U.S. application Ser. No. 13/445,026.

In addition to the advantages presented above, another advantage of the current invention is that it is easily assembled and disassembled, providing flexibility for the user. For instance, if the user needs to utilize the full depth and breadth of bed liner 300, all bin dividers 600 and 620, bin tops 500 and bin sides 400 may be removed and placed flat on the bottom of bed liner 300. Items can then be placed on top of the components. Alternatively, there may be a plurality of bottom notches across the width of bed liner 300 such that bin tops 500 and bin sides 400 may be slid into notches spaced very closely together, thereby packing all components closely together and providing the majority of space within bed liner 300 for other storage.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for storing items in a vehicle that includes a bed and a tailgate, comprising:
    a bed liner attached to said bed of said vehicle;
    storage bin sides and storage bin tops configured for attachment to said bed liner;
    notches in said bed liner configured to slidably receive storage bin sides and storage bin tops;
    mating components on said storage bin sides configured for attachment to said notches of said bed liner;
    mating components on said storage bin tops configured for attachment to said notches of said bed liner;
    bin dividers configured to be secured to both said bed liner and said storage bin sides;
    a tailgate liner attached to said tailgate of said vehicle; and
    locking features in said tailgate liner configured to contact said storage bin tops when the tailgate is closed to prevent said storage bin tops from being opened.

2. The system of claim 1, further comprising: locking features in said bed liner configured to slidably receive said storage bin tops when said storage bin tops are in the closed position.

3. The system of claim 1, wherein said storage bin sides include notches configured to slidably receive said bin dividers.

4. The system of claim 3, wherein said bin dividers include mating notches configured for attachment to said notches of said storage bin sides.

5. The system of claim 4, wherein said bed liner includes mating notches configured for attachment to said notches of said storage bin sides.

6. The system of claim 1, wherein said system, when in its fully assembled state, provides storage bins along the sides of said bed liner, said storage bins being provided by assembling said storage bin sides to said bed liner, said storage bin tops to said bed liner, and said bin dividers to said storage bin sides and said bed liner, and a center section in between said storage bins, said center section being provided by the space between said storage bin sides when said storage bin sides are assembled to said bed liner.

7. The system of claim 6, further comprising; a center section cover attached to said storage bin top, said center section cover providing means to selectively cover said center section.

8. The system of claim 7, wherein said center section cover is attached to said storage bin top by a hinge.

* * * * *